United States Patent [19]

Doniat

[11] 4,248,684

[45] Feb. 3, 1981

[54] ELECTROLYTIC-CELL AND A METHOD FOR ELECTROLYSIS, USING SAME

[75] Inventor: Denis Doniat, Paris, France

[73] Assignee: SORAPEC Societe de Recherche et d'Applications Electrochimiques, Paris, France

[21] Appl. No.: 957,040

[22] Filed: Nov. 2, 1978

[51] Int. Cl.³ .............................................. C02B 1/82
[52] U.S. Cl. .................................. 204/149; 204/130; 204/152
[58] Field of Search ............... 204/1 R, 149, 152, 268, 204/130

[56] References Cited

U.S. PATENT DOCUMENTS

| | | | |
|---|---|---|---|
| 751,986 | 2/1904 | Kartzmark | 204/149 |
| 760,302 | 5/1904 | Boucher | 204/149 |
| 1,131,067 | 3/1915 | Landreth | 204/149 |
| 3,692,661 | 9/1972 | Shockcor | 204/152 X |
| 3,761,383 | 9/1973 | Backhurst et al. | 204/268 |
| 3,915,822 | 10/1975 | Veltman | 204/149 X |
| 4,004,994 | 1/1977 | Andrus | 204/149 |
| 4,048,030 | 9/1977 | Miller | 204/149 |
| 4,053,378 | 10/1977 | Moeglich et al. | 204/149 |

*Primary Examiner*—Arthur C. Prescott
*Attorney, Agent, or Firm*—Bucknam and Archer

[57] ABSTRACT

In an electrolytic cell, an electrolyte is caused to flow between an anode and a cathode. The conventional separator between the anode compartment and the cathode compartment can be eliminated, thus allowing circulation of a dispersed electrode throughout the electrolytic cell and obviating the drawbacks resulting from the use of a separator. The dispersed electrode is constituted by a suspension of conductive particles in said electrolyte.

5 Claims, 1 Drawing Figure

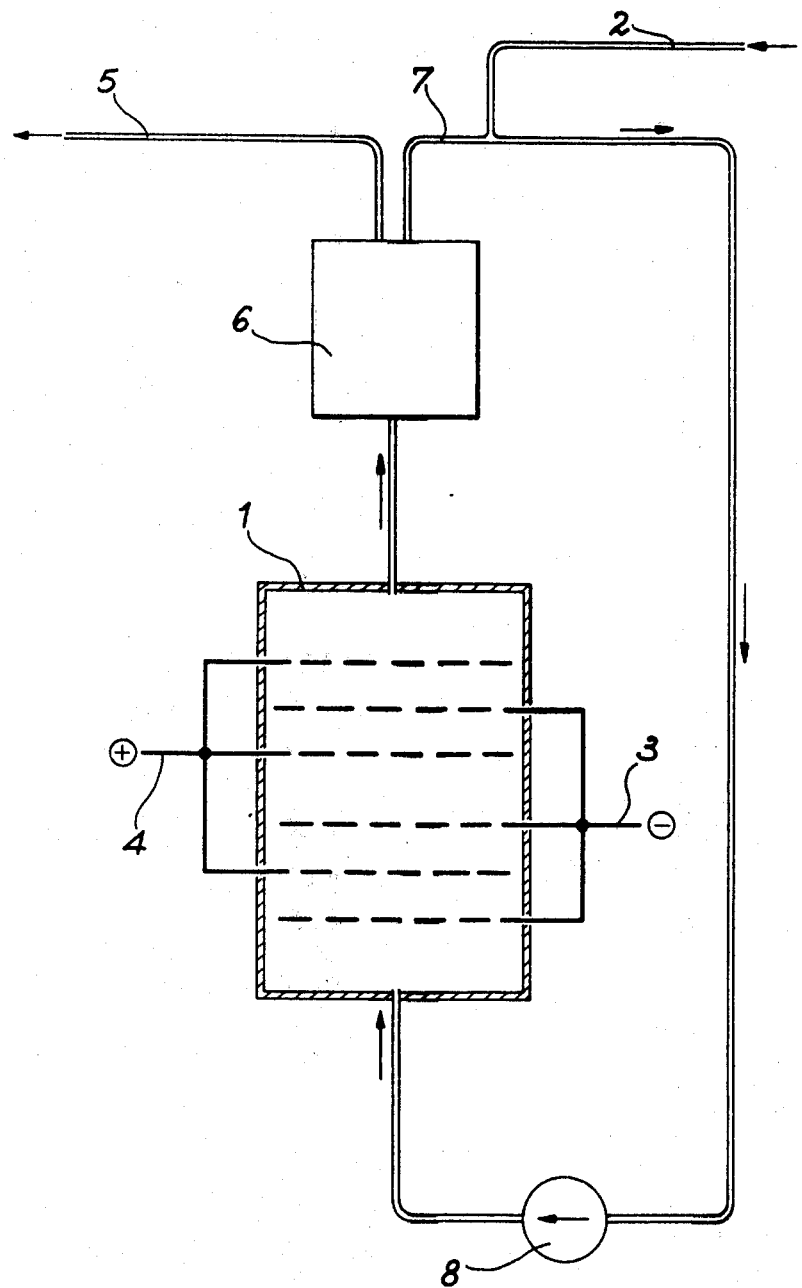

ELECTROLYTIC-CELL AND A METHOD FOR ELECTROLYSIS, USING SAME

The present invention relates to techniques involving electro-chemical reactions. It is more specifically related to a method involving oxido-reduction reactions and to the design of an electrolytic-cell suitable for practising said method.

The present invention is likely to have applications as varied as the possible uses of electro-chemical reactions, in various industrial fields. However, the following description will more specifically refer to two broad fields, viz. the electrolysers for converting chemicals in an electro-chemical synthesis, and those used for treating industrial effluents in order to eliminate toxic or contaminating organic compounds from said effluents.

The present invention results from the observation that the opposite reactions (direct and reverse reactions) occurring at the level of the electrodes of each polarities have quite often highly different rates, and that this generally apply to fast all usual oxidation or reduction reaction.

Up to this day, for fear that the undesirable one of the two opposite reactions should annihilate the desired one, one has been led to separate the electrodes by means of a diaphragm, or separator, adapted to divide the electrolytic bath. It is the usual practice to have the electrolytic operations carried out in electrolysers divided, by means of a separator, into two or more compartments, respectively containing one of the electrodes of opposite polarities immersed in an electrolyte. Such a separator should be both porous enough so as to be pervious to the ions providing the flow of electric current from one compartment to the other, and capable, however, to act as an efficient barrier with respect to the reactants or products involved in the electro-chemical reactions in each of said compartments.

Such a separator has a number of drawbacks : in particular, its very presence is sufficient for inducing an ohmic drop between the electrodes, such a drop being all the more important as the electrolyser is operating at higher current-densities.

The object of the invention is to obviate these drawbacks.

According to the invention the electrolytic process is performed by contacting the electrolyte containing the reactants simultaneously with the cathode and the anode at different polarities, with no diaphragm between them.

By eliminating the separator, it further becomes possible to resort to a dispersed electrode circulating through the whole electrolyte and, therefore, capable of being in contact with both the fixed cathode and the fixed anode. However, the polarity of said dispersed electrode can be considered as unambiguously defined, and actually determined by the direction of that of the reactions the rate of which is the faster. A so-called "dispersed electrode" is constituted, as known per se, by conductive particles in suspension in an electrolyte. The use of such a dispersed electrode permits to improve further the efficiency of the operation.

The method of the invention can be used in all cases in which the components in an aqueous solution have oxido-reduction properties such that one of the two opposite reactions (viz. oxidation or reduction) develops with a faster kinetics than the other. In such a case, the electrolytic solution can be brought into contact simultaneously with the positive electrodes and the negative ones, without, however, the risk that those reactions taking place in the vicinity of the electrodes with a given polarity should be annihilated by those taking place in the vicinity of the electrodes with the opposite polarity. With each of the compounds to be transformed or eliminated, only one reaction (viz. either an oxidation-reaction at the positive electrode, or a reduction-reaction at the negative electrode) is likely to occur with a substantial rate. This effect can be favourably amplified, if need be, through an appropriate selection of the relative areas of the electrode with opposite polarities.

Such a method is in a position to be applied in a specially advantageous manner, either in the field of electro-synthesis operations, or for treating industrial waste effluents and especially aqueous effluents containing organic compounds which are to be destroyed by oxidation. These represent particular instancy of the more general case of the electrolysis methods, according to which an electrolyte containing soluble reactants is treated with a view to converting such soluble reactants into products which are soluble in the electrolyte too.

Since it is not required to provide between the electrodes any separator preventing the cathodic reaction products from coming into contact with the anode, and conversely, the proposed method leads to a simplification in the design and operation of the electrolysis cells, which makes the latter specially suitable, in particular, for treating industrial effluents in their very exhaust circuit, in a continuous process wherein the effluent flows through an electrolytic cell and constitutes there the electrolyte submitted to electrolytic oxidation of its organic components.

As a possible example of the applications of the method according to the invention, the following description will put stress on the advantages of said method over the usual methods and devices for the treatment of effluents, and describe a basic diagram with no restrictive intent.

According to usual practice, the treatment of waste effluents requires either the physical elimination of toxic or contaminating organic compounds, or the chemical transformation of the latter with a view to render same harmless. In the first case, either ion-exchanging resins, or active coal are resorted to, while, in the second case, use is made of chemical products with oxidizing or reducing effects, adapted to transform contaminants into readily recoverable and separable substances.

These two modes of treatment have a number of drawbacks, and in particular : a high cost-price in view of the use of costly substances and large cumbersome devices; the need of a permanent maintenance of the equipment by a skilled personnal; an ever unsatisfactory answer to the problem of continuous operation; a low energetic efficiency; a treatment with a duration likely to induce a decrease of the operation rhythm of the manufacturing unit.

The present invention, in its application to the treatment of waste effluents, permits to obviate the above drawbacks, through the installation of an electro-chemical device that can be directly mounted in the exhaust circuit of contaminating waste effluents.

The appended drawing shows such a device to illustrate its uses in the treatment of waste effluents containing organic compounds which are to be eliminated by oxidation.

Electrolytic cell 1 is directly fed through the effluent-exhaust line 2. In particular, similarly to the case of an electrolytic cell adapted to electro-chemical synthesis operations, the cathode 3 and the anode 4 can be arranged in the following two ways, supposing a dispersed electrode is admixed with the electrolyte constituted by the effluent:

either on both sides of the cell, said cathode and anode forming, for instance, the very walls of section of the conduit; the suspension constituted by the electrolyte and the dispersed electrode circulating between said cathode and anode;

or transversely to the effluent flow, in which case the suspension has to pass through the fixed electrodes. Said fixed electrodes, in such a case, can be of various shapes and, in particular, can be constituted by plates provided with holes through which the necessary migration of the suspension takes place; grids acting in the same manner; or else a network of wires, tubes or plates, or generally any structure disposed transversally to the flow and provided with holes of a size greater than the size of particles of the dispersed electrodes to let them pass through.

Once purified, the effluent leaves the device at 5, after having passed through a filter 6, in particular a rotary filter, adapted to recover the particles of the dispersed electrode which are sent back to 7 for being recirculated through the cell, the re-introduction thereof into the circuit being controlled by a pump 8.

The efficiency of the method can be evaluated by measuring the reduction in the oxygen chemical demand, which is the amount of oxygen that is required to complete the oxidation reaction of the organic compounds in the effluent. This oxygen demand, or consumption, is expressed as the weight of oxygen per unit volume of effluent. The figures obtained after the treatment according to the invention, for a given feeding effluent, are much lower than with the conventional methods, although the time the effluent stays in the electrolytic cell is reduced. In a typical example, considering a waste effluent from a gun-powder factory, with an oxygen demand of 15,000 to 20,000 mg/l, the oxygen demand is reduced to 100 to 500 after the treatment according to the invention, while no method was known up to now which could reduce it to less than some thousands mg/l.

Quite obviously, and as appears from the above description, the invention is not restricted to the embodiments disclosed, given merely by way of examples. In particular, the invention covers the application of any other method permitting to perform an electrolysis reaction in the absence of a separator between the anode compartment and the cathode compartment. Moreover, as appears from the figure, several anode-cathode pairs can be arranged in series along the circuit of the effluents forming the electrolyte, to which are added the conductive particles of the dispersed electrode.

I claim:

1. An electrolysis method for electrolytic oxidation or reduction of at least one compound in solution comprising circulating the solution through a vessel containing at least two electrodes immersed therein transversally to the direction of flow, polarizing the electrodes to opposite polarities wherein the solution flows freely through perforations provided in each of said electrodes and additionally admixing particles of a dispersed electrode to the solution upstream of the vessel, circulating said dispersed electrode together with the solution through said electrodes in said vessel, and separating said dispersed electrode from the solution, downstream the vessel.

2. A method according to claim 1, wherein said solution is an effluent to be electrolytically purified.

3. The method according to claim 1 wherein the polarity of said dispersed electrode is determined by the direction of the reaction having the faster rate.

4. The method according to claim 1, wherein both an oxidation reaction and a reduction reaction occur in said vessel.

5. The method according to claim 1, wherein said solution containing at least one compound being subjected to electrolytic oxidation and reduction is an industrial waste effluent.

* * * * *